No. 693,732. Patented Feb. 18, 1902.
H. MORGAN.
BAR MIXING GLASS.
(Application filed Sept. 27, 1901.)
(No Model.)
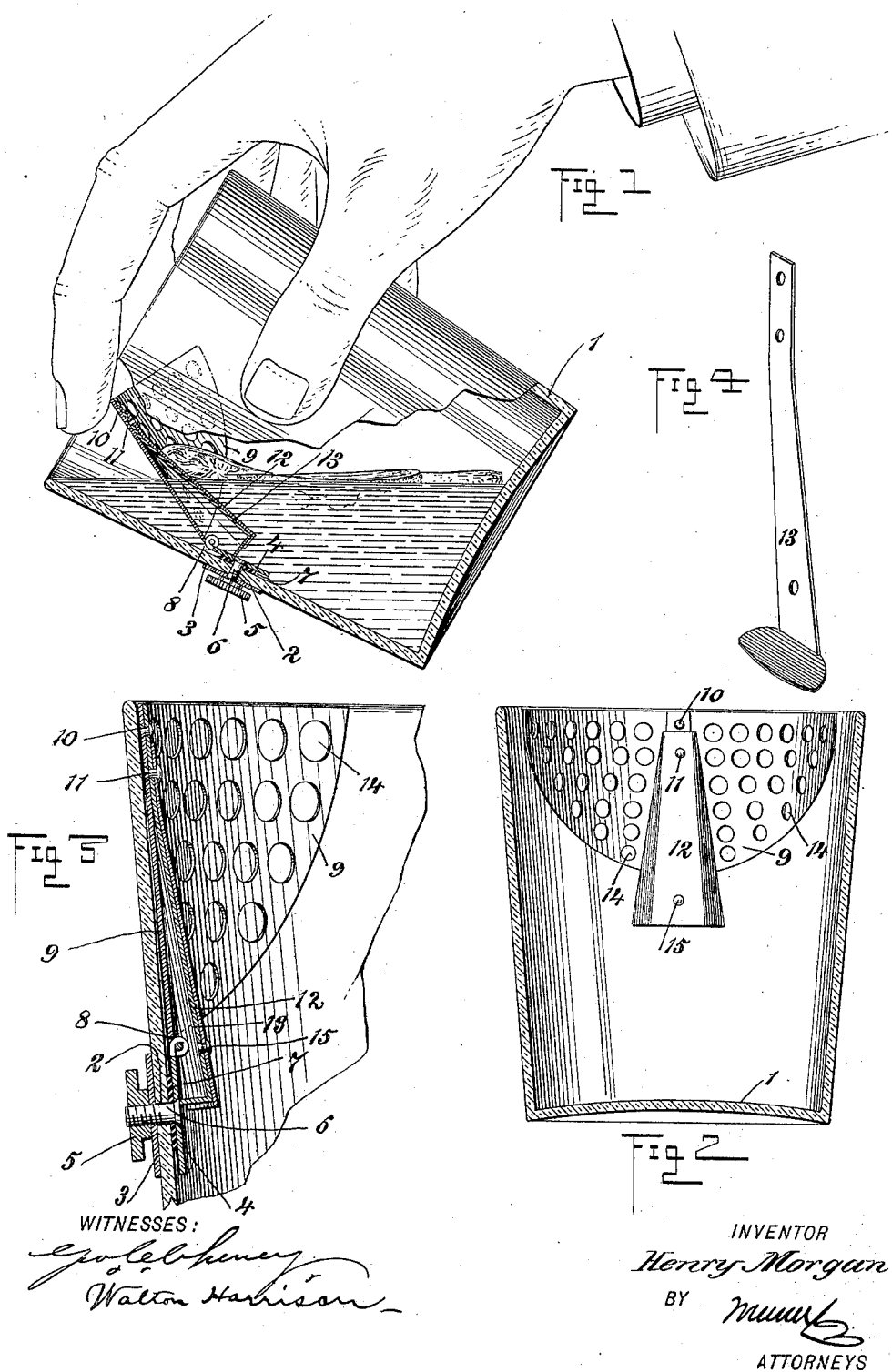
WITNESSES:
INVENTOR
Henry Morgan
BY
ATTORNEYS

UNITED STATES PATENT OFFICE.

HENRY MORGAN, OF CRIPPLECREEK, COLORADO, ASSIGNOR OF ONE-HALF TO JOHN O'RILEY, OF CRIPPLECREEK, COLORADO.

BAR MIXING-GLASS.

SPECIFICATION forming part of Letters Patent No. 693,732, dated February 18, 1902.

Application filed September 27, 1901. Serial No. 76,790. (No model.)

*To all whom it may concern:*

Be it known that I, HENRY MORGAN, a citizen of the United States, and a resident of Cripplecreek, in the county of Teller and State of Colorado, have invented a new and Improved Bar Mixing-Glass, of which the following is a full, clear, and exact description.

My invention relates to a bar mixing-glass—that is, a glass for the use of bar-keepers in mixing drinks.

In the accompanying drawings like letters indicate like parts in all the views.

Figure 1 is a side elevation of the glass, partly broken away and in section, the straining device also being shown in section. Fig. 2 is a vertical section of the glass, the straining device being shown in elevation. Fig. 3 is a fragmentary vertical section of the straining device applied to the glass, and Fig. 4 is a perspective view of a spring for preventing the strainer from moving too far inward and for pressing the strainer against the internal surface of the glass.

The glass 1 is provided with a hole 2 and with plates 3 and 4, which are secured in position by a thumb-nut 5, preferably provided with a milled edge and which engages a screw 6. A thin sheet of rubber 7 is sandwiched between the inner plate and the inner surface of the glass to afford elasticity and distribute the strain exerted by the screw upon the glass. The inner plate 4 is provided at its upper end with a hinge 8, whereby the strainer 9 is rendered flexible. The strainer 9 is preferably semicircular in general outline, as shown in Fig. 2, and is curved or bent to conform to the inner surface of the glass. Secured to the strainer by means of bolts 10, 11, and 15 is an L-shaped spring 13 for preventing the strainer from inclining too far inward, as indicated in Fig. 3. A guard-plate 12 of substantially V shape protects the spring 13 and prevents objects from getting under the same. The strainer 9 is provided with holes 14, which prevent the passage of such objects as lemon-seeds or other floating bodies.

My invention is used as follows: Supposing that the parts are secured to a glass or tumbler and are in the position shown in Fig. 3, the drink is mixed or the lemonade is prepared and shaken in the usual manner. The bar-tender then tilts the strainer into the position shown in Fig. 1, thus preventing egress of any objects which may be floating in the liquid. The liquid passes through the holes in the strainer and out of the glass, being poured into a serving-glass or other receptacle.

It will be noted, therefore, that I have produced a neat, compact, simple, and cheap device, very efficient in action, and which can very readily be taken off one glass and secured to another. No particular skill is required in attaching the device to the glass.

Having thus described my invention, I claim as new and desire to secure by Letters Patent—

1. A bar mixing-glass, comprising a mixing vessel provided internally with a hinge, and a strainer loosely pivoted upon said hinge.

2. A bar mixing-glass, comprising a mixing vessel provided internally with a hinge, a strainer loosely mounted upon said hinge, and a spring for normally pressing said strainer into a predetermined position.

3. A bar mixing-glass, comprising a mixing vessel provided with an aperture, a hinge, a screw passing through said aperture for securing said hinge inside of said vessel, and a semicircular strainer mounted upon said hinge and bent into conformity with the internal shape of said mixing vessel.

4. A bar mixing-glass, comprising a glass mixing vessel provided with an aperture, a hinge, a screw passing through said aperture for securing said hinge inside said vessel, a semicircular strainer mounted upon said hinge and bent into conformity with the internal shape of said vessel, an L-shaped spring for normally pressing said strainer against the internal surface of the vessel, and a substantially V-shaped guard adjacent to said spring.

5. As an article of manufacture, a member provided with a hinge, means for securing said member to the interior of a glass, a strainer mounted upon said hinge, and a spring engaging said member and said strainer.

In testimony whereof I have signed my name to this specification in the presence of two witnesses.

HENRY MORGAN.

Witnesses:
J. E. HANLEY,
D. B. HUMPHREY.